J. U. BARR.
EXTRA TIRE LOCK.
APPLICATION FILED MAR. 15, 1912.
1,097,608.
Patented May 26, 1914.
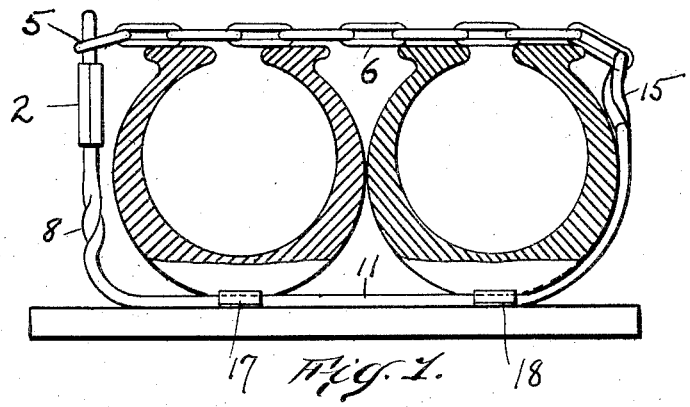
Fig. 1.
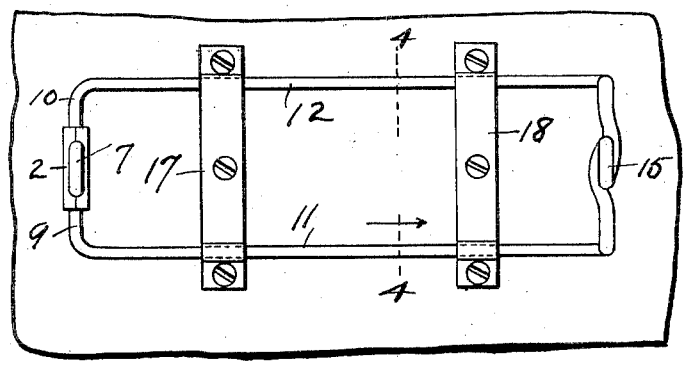
Fig. 2.
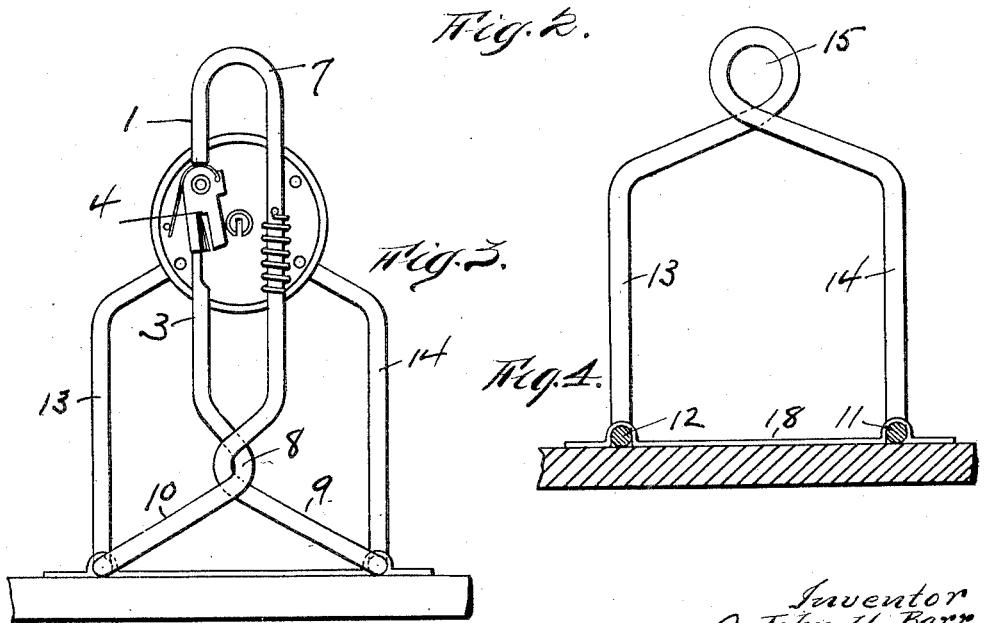
Fig. 3.
Fig. 4.
Witnesses:
E. A. Janis
Mabel Dittenhoffer
Inventor
John U. Barr
by F. Warren Wright
attorney

UNITED STATES PATENT OFFICE.

JOHN U. BARR, OF NEW YORK, N. Y.

EXTRA-TIRE LOCK.

1,097,608.   Specification of Letters Patent.   Patented May 26, 1914.

Application filed March 15, 1912. Serial No. 683,981.

*To all whom it may concern:*

Be it known that I, JOHN U. BARR, a citizen of the United States, residing at New York city, in the county and State of New York, have invented certain new and useful Improvements in Extra-Tire Locks, of which the following is a clear, full, and exact description.

This invention relates to a lock, particularly adapted for use in securing extra automobile tires in place on the dash boards of automobiles.

The object of the invention is to provide an improved, efficient and inexpensive device of this character, which will have no parts to become lost or displaced, as is the case with ordinary pad locks.

The scope of the invention will be pointed out in the claim.

In the accompanying drawings: Figure 1 is a side elevation of my improved device, showing tires in place, the tires being shown in section. Fig. 2 is a plan view of my improved device. Fig. 3 is an end view of the side elevation with one cover of the lock casing removed. Fig. 4 is a section on line 4—4 Fig. 2 taken in the direction of the arrow.

As shown in the drawings: The sliding bolt for the lock consists of a loop of wire having one end 1 passing through the lock casing 2, which is composed of two similar shells, and the other end 3, also passing through the lock casing, between which the tumblers 4 occupy the position of Fig. 3 when the device is locked, but when the device is unlocked, the end 3 of the wire passes into the slots in the tumblers, and permits the casing to be slid downwardly to cause the end 1 to stand out free and clear of the casing, so that a link 5 of a chain 6 may be caused to engage with the extending end 7 of the lock bolt. A spring is provided between the casing and bolt which tends to slide the casing when the tumblers 4 are turned to unlocked position. The two ends 1 and 3, when properly formed, are twisted together at 8 and bowed out away from each other in legs 9 and 10; then bent to form two parallel legs 11 and 12, which are again bent to form two upstanding members 13 and 14, which are joined by the loop 15 as shown in Fig. 4. The loop 15 serves to form an anchor for one end of the chain 16. Plates 17 and 18, passing over the parallel legs 11 and 12, are used to bolt the device on to the running board or other support. It will be seen that a single wire properly bent and formed, acts as an anchor for the chain and attachment devices to the run board, and as a bolt for the lock; that the lock casing is always in position on the bolt, and hence cannot be lost.

I claim as my invention.

The herein described locking device consisting of a casing, a bolt having two parallel members passing through the casing, one of said members having an opening, both of said members extending away from the casing and so formed and bent as to provide a space for receiving tires, and a flexible member secured to said members being adapted to be inserted in the opening of the aforesaid parallel members, said casing sliding on the members so that in one position it will cover said opening and mechanism for locking said casing in position.

Signed at New York city, New York, this 14 day of March, 1912.

JOHN U. BARR.

Witnesses:
 FRED F. WEISS,
 MABEL DITTENHOEFER.

Copies of this patent may be obtained for five cents each, by addressing the "Commissioner of Patents, Washington, D. C."